UNITED STATES PATENT OFFICE.

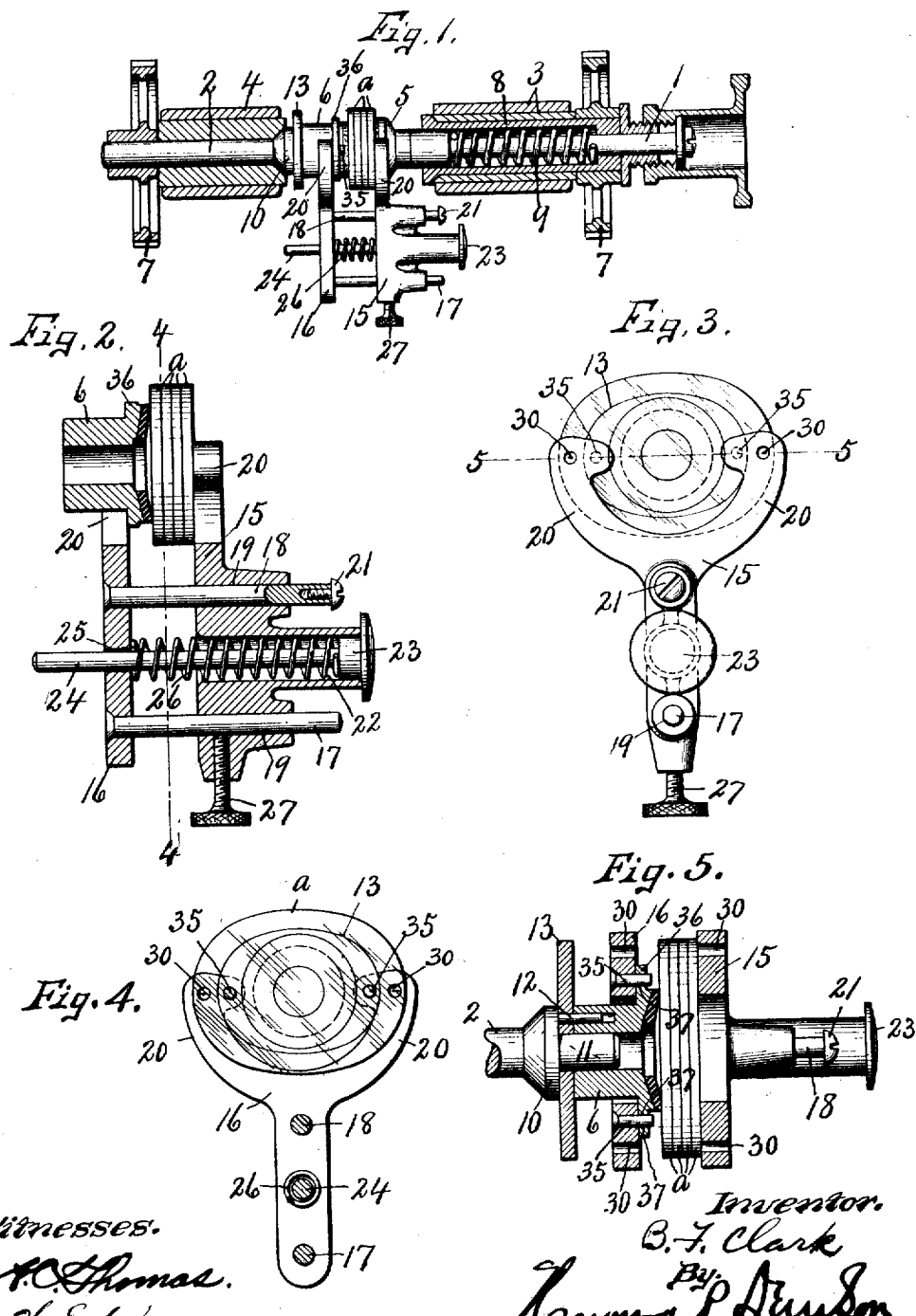

BENNETT F. CLARK, OF GENEVA, NEW YORK, ASSIGNOR TO THE STANDARD OPTICAL COMPANY, OF GENEVA, NEW YORK, A CORPORATION OF NEW YORK.

INSTRUMENT FOR POSITIONING LENSES.

944,846.  Specification of Letters Patent.  Patented Dec. 28, 1909.

Application filed June 3, 1908. Serial No. 436,448.

*To all whom it may concern:*

Be it known that I, BENNETT F. CLARK, of Geneva, in the county of Ontario, in the State of New York, have invented new and useful Improvements in Instruments for Positioning Lenses, of which the following, taken in connection with the accompanying drawings, is a full, clear, and exact description.

This invention relates to an instrument for positioning lenses in edge grinding machines by which one or more lenses may be held and readily placed between the clamping heads of a rotary lens holder with their optical axes in registration with each other and with the corresponding axis of the lens pattern or form.

The optical axes of the lens blanks which are to be ground to a certain size and form are usually indicated thereon by suitable marks or lines while the master pattern or lens-form which is coaxial and rotates with the lens holders is also provided with some means for indicating a corresponding axis whereby the lenses may be properly adjusted in the grinding machine with their optical axes in substantially the same axial plane as the corresponding axis of the lens-form.

My object, therefore, is to provide a simple and practicable instrument in which the lenses to be ground may be quickly and easily alined with respect to their optical axes and by which such lenses may be expeditiously and accurately placed in the edge grinding machine in proper relation to the pattern or form.

Other objects and uses relating to specific parts of the instrument will be brought out in the following description.

In the drawings—Figure 1 is a sectional view of the machine. Fig. 2 is an enlarged sectional view of the detached instrument as seen in Fig. 1. Fig. 3 is a side elevation of the same. Figs. 4 and 5 are sectional views taken respectively on lines 4—4, Fig. 2 and 5—5, Fig. 3.

In Fig. 1 I have shown a portion of an edge grinding machine for lenses in which a pair of coaxial rotary spindles —1— and —2— are rotatingly mounted in suitable bearings —3— and —4— and provided at their meeting ends with suitable clamping heads —5— and —6— forming a rotary lens holder, said spindles being rotated at the same rate of speed by gears —7—.

The intermediate portion of the spindle —1— is surrounded by a sleeve —8— which is journaled directly in the bearings —3— and contains a coil spring —9— by which the spindle —1— is forced endwise toward the spindle —2— to clamp the lenses as —a— between the clamping heads —5— and —6—, it being understood that the spindle —1— may be moved by hand against the action of the spring —9— to draw the head —5— away from the head —6— when it is desired to release the lenses from between the clamping heads.

The spindle —2— is provided at its inner end with an annular abutment —10— having a center pin —11— and an eccentric pin —12— which in this instance project inwardly from the annular abutment —10— and form suitable supports for receiving and locking a lens pattern or form —13— to the adjacent end of the spindle —2—. This lens pattern or form —13— is provided with a central and eccentric apertures corresponding to and receiving the pins —11— and —12— which enables said lens pattern to be readily placed upon or removed from the spindle —2— and when placed in operative position is brought against the abutting shoulder —10— and is locked to rotate with the spindle by means of the eccentric pin —12—.

The pins —11— and —12— protrude or project some distance beyond the inner face of the lens form or pattern —13— when the latter is against the abutment —10— for receiving the clamping head —6— and locking the same to the spindle —2—, the adjacent face of said clamping head which is coaxial with the spindles —1— and —2— being provided with central and eccentric apertures or sockets for receiving the pins or studs —11— and —12—.

It is now clear that the lens form or pattern —13— and clamping head —6— are successively placed upon the spindles —11— and —12— and thereby locked to rotate with the spindle —2—; the lens form or pattern —13— abuts against the abutment —10— while the adjacent end of the clamping head —6— abuts against the inner face of the lens pattern and although these parts may be readily removed by hand endwise from the pins —11— and —12—, they are held in operative position by the pressure of the lenses against the inner face of the head —6— through the medium of the head —5— and spring —9—, it being understood that the adjacent face of the clamping heads —5— and —6 are provided with the usual contact face, as rubber, for preventing injury to the lenses and frictionally holding them in operative position during the grinding operation.

The removability of the clamping head —6— is an important feature of my invention in that it forms a part of the lens alining instrument which I will now proceed to describe. This instrument consists essentially of the clamping head —6— and opposed plates or clamps —15— and —16— which are adjustably connected and are movable toward and from each other and together constitute a clamp between which the lenses may be held. The clamping ends of the plates —15— and —16— are similar in form, each being provided with a pair of diverging arms —20— terminating some distance apart sufficient to form a clear open space of less width than the longest diameter of the lens but of slightly greater width than the diameters of the heads —5— and —6— which are adapted to enter between said arms in a manner hereinafter described. The clamping plate —16— is provided with a pair of laterally projecting studs or guide arms —17— and —18— while the clamping plate —15— is provided with a pair of corresponding apertures or ways —19— which receive the laterally projecting ends of the studs or arms —17— and —18— thereby connecting and locking the clamping plates against relative endwise movement and at the same time permitting them to be adjusted toward and from each other, the guide rod —18— being provided at its outer end with a limiting stop or shoulder —21— which prevents undue displacement of the clamping plates one from the other. The portion of the plate —15— between the aperture —19— and guide rods —18— is provided with an elongated socket or opening —22—, the outer end of which is closed by a cap —23— having an inwardly or laterally projecting spindle —24— which extends through the socket —22— and through a corresponding aperture —25— in the plate —16— to further guide said plates in their adjustment toward and from each other, the head —23— being secured by a close fit in the outer end of the socket —22—. These clamping plates are normally forced apart by a coil spring —26— which surrounds the intermediate portion of the spindle —24— with one end abutting against the cap —23— and its other end abutting against the inner face of the clamping plate —16— thereby exerting a tension tending to force said plates apart until checked by limiting stop —21— or locked in their adjusted position by a set screw —27— which is engaged in a threaded aperture in the plate —15— and is movable into and out of engagement with the adjacent stud or guide arm —17— as best seen in Fig. 2. The arms —20— extend some distance beyond the outermost guide rod or spindle —18— leaving a free open space between said arms for the reception of the lenses as —a—. The axes of the spindles —17—, —18— and —24— are located one in advance of the other in the same plane and the arms —20— diverge symmetrically therefrom so that the outer ends of the arms are spaced apart equi-distant from the longitudinal center or axis of the clamping device with the marginal edges of the lens blanks when in operative position between the clamping plates —15— and —16—.

The optical axes of the lenses are usually indicated thereon by marks at opposite ends thereof and in placing the lenses in the alining instrument or between the plates —15— and —16—, these marks are brought into registration with each other and with sight openings —30—, the latter serving as a visual means by which the optical axes of the lenses may be registered with each other and also brought into proper relation with the lens-form or pattern —13—.

In order that the proper positioning of the lenses relatively to the lens pattern or form may be rendered more expeditious and certain, the clamping plate —16— is provided at opposite sides of its axis with protruding studs —35— and the clamping head —6— is provided with a flange —36— having apertures —37— corresponding to and receiving the protruding ends of the studs —35—. When the clamping head is locked to the spindle —2— by the eccentric pin —12—, the apertures —37— for receiving the studs —35— are disposed in the same diametrical plane as the long axis of the lens form or pattern —13— corresponding to the optical axis of the lenses.

Now when it is desired to place the lenses in the lens holder of the edge grinding machine with their optical axes in registration with each other and in the same diametrical plane as the axis of the lens pattern or form, the lens clamps are first allowed to open by the spring —26— which is accomplished by simply loosening the set screw —27— whereupon the clamping head —6— is placed in operative position upon the clamping plate —16— as seen in Fig. 2 with the flange —36— abutting against the inner face of the arms —20— and the pins or studs —35— entering the apertures —37— while the hub of the clamping head —6— projects outwardly between said arms. As many lenses as it may be desired to grind at once are now placed between the arms —20— of the clamping plate —15— and inner face of the clamping head —6— on the plate —16— and these lenses are then adjusted by hand to bring the marks indicating their optical axes into registration with each other and with the sight openings —30— whereupon the plates are pressed toward each other against the action of the spring —26— until the lenses are firmly held between the arms —20— of the clamping plate —15— and inner face of the clamping head —6— on the plate —16— and then the set screw is tightened to hold the clamping plates in their adjusted position against the action of the spring —26—. The lenses are now arranged with their optical axes in exact registration with each other and in the same diametrical plane as the pins or studs —35— and in order to bring them into proper position in the edge grinding machine, the head —5— is forced back by hand against the action of the spring —9— sufficiently to allow the lenses with the clamping head —6— to be placed between the clamping head —5— and inner ends of the spindles —1— and —2—, whereupon the spindle —2— is adjusted by rotation, if necessary, to bring its eccentric pin —12— into registration with the corresponding eccentric socket in the adjacent end of the clamping head —6—, at the same time registering the central socket of said clamping head with the adjacent end of the spindle —11—, after which the alining instrument with the lenses therein is moved laterally to cause the pins —11— and —12— to enter their respective sockets thereby locking the clamping head —6— and the spindle —2— and at the same time the clamping head —5— is released to allow the spring —9— to force it between the arms —20— of the clamping head —15— and against the adjacent lenses. Now by loosening the set screw —27—, the spring —26— operates to separate the plates —15— and —16— thereby disengaging the pins —35— from the apertures —37— and clamping head —6— and allowing both clamping plates —15— and —16— to be withdrawn radially from both clamping heads —5— and —6—, the lenses being then in position for grinding.

By providing two or more clamping heads —6— it is evident that during the operation of grinding one set of lenses, one or more other sets may be adjusted in the alining instrument and quickly placed in operative position in the edge grinding machine when the previously inserted lenses are ground to the desired size and form and removed.

What I claim is:

1. In combination with a rotary lens pattern and a coaxial clamping head of a lens grinding machine, and a lens clamp including a removable clamping head adapted to be placed with the lenses between the first named clamping head and lens pattern, and means for locking the removable clamping head to rotate with the lens pattern, the remaining portion of the clamping device being separable from the removable clamping head when the latter is placed in the machine, said device having sight openings by which the optical axes of the lenses may be alined with each other.

2. In combination with coaxial spindles of an edge grinding machine for lenses, a lens pattern locked to one of the spindles to rotate therewith, a removable lens clamping head also locked to rotate with one of the spindles, clamping plates movable toward and from each other for receiving between them the lenses, one of said plates and clamping head having interlocking members detachably interlocked with each other, one of said plates having means with which the marks on the lenses indicating the optical axes may be registered.

3. In combination with the rotary lens pattern and lens clamping head of an edge grinding machine, a lens clamping device having means with which the optical axes of the lenses may be registered, said clamping device having a removable clamping member transferable to the grinding machine to constitute the other lens clamping head thereof, and means for holding the transferred head in fixed position relatively to the pattern.

In witness whereof I have hereunto set my hand this 28th day of May 1908.

BENNETT F. CLARK.

Witnesses:
CHARLES H. ANNAN,
C. B. ROGERS.